United States Patent

Schmid

[15] 3,650,552

[45] Mar. 21, 1972

[54] BALL JOINT, ESPECIALLY FOR THE STEERING LINKAGE OF MOTOR VEHICLES

[72] Inventor: Leopold F. Schmid, Pischekstrasse 49, 7000 Stuttgard-O, Germany

[22] Filed: Mar. 31, 1970

[21] Appl. No.: 24,111

[30] Foreign Application Priority Data

Apr. 1, 1969 Germany ..................... P 19 16 579.8

[52] U.S. Cl. ............................................ 287/90 RJ, 287/87
[51] Int. Cl. ................................................ F16c 11/06
[58] Field of Search ........................... 287/90 A, 90 C, 87

[56] References Cited

UNITED STATES PATENTS

| 2,937,895 | 5/1960 | Langen et al. | 287/87 |
| 3,066,963 | 12/1962 | Vogt | 287/87 |
| 3,160,430 | 12/1964 | Gottschald | 287/87 |
| 3,225,420 | 12/1965 | Sullivan, Jr. | 287/90 A X |
| 3,273,924 | 9/1966 | Maxeiner | 287/90 A |
| 3,424,484 | 1/1969 | Andexler | 287/87 |

Primary Examiner—Andrew V. Kundrat
Attorney—Walter Becker

[57] ABSTRACT

A ball joint, especially for the steering linkage of motor vehicles, in which the ball head is journaled in ball socket means provided with annularly arranged spring elements of different spring characteristics which spring elements are adapted under increasing load successively to abut a portion of the ball joint housing so that successively the spring elements of different spring characteristic become effective.

3 Claims, 4 Drawing Figures

Patented March 21, 1972
3,650,552
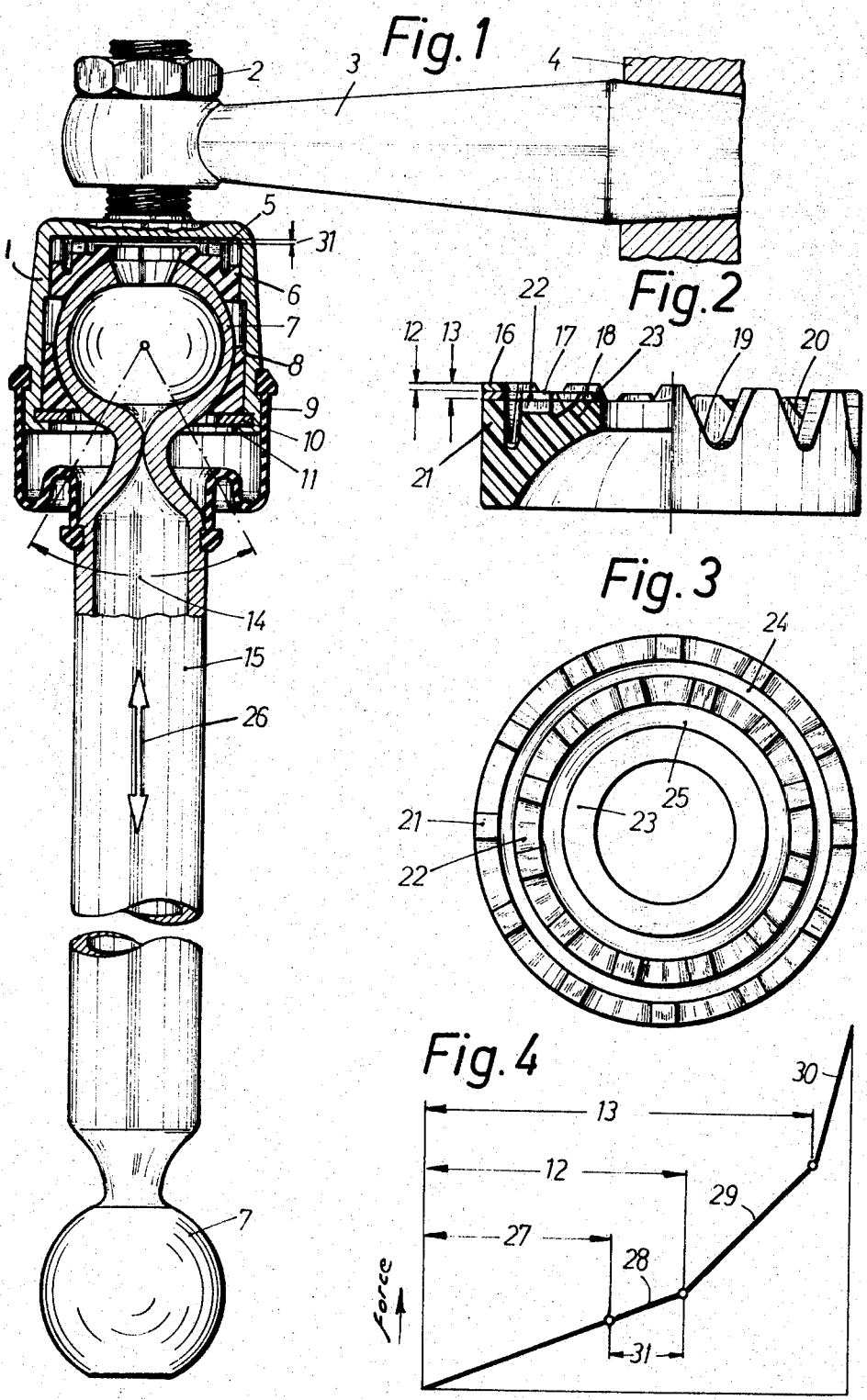
INVENTOR.
Leopold F. Schmid
BY
Walter Becker

BALL JOINT, ESPECIALLY FOR THE STEERING LINKAGE OF MOTOR VEHICLES

The present invention relates to a ball joint, especially for the steering linkage of a motor vehicle, in which for purposes of a play-free preloaded and yieldable mounting of the ball stud in the housing of the joint there is employed a socket-shaped bearing body which consists of an elastically deformable material, for instance, polyurethane, and which is provided with recesses formed by a plurality of spring elements which aid the elastic deformation of the bearing body.

Ball joints for steering linkages pertain to the most important structural elements of a motor vehicle. On one hand, they have to have a high degree of strength because considerable forces act upon them, and because a breakage of these structural elements may have catastrophic consequences. On the other hand, these elements should be as light as possible because, depending on their position, the weight of these elements is only partially or not at all cushioned. The general tendency is to keep the non-cushioned mass of a motor vehicle as small as possible.

It is an object of the present invention to provide a ball joint of the above mentioned type which will be able to reduce the shocks entering the joints to such an extent that the steering linkage can be dimensioned considerably weaker to save weight and manufacturing costs while retaining the same strength as correspondingly designed prior art ball joints.

This object and other objects and advantages of the invention will appear more clearly from the following specification in connection with the accompanying drawing, in which:

FIG. 1 illustrates partly in section and partly in view a ball joint according to the invention for connection of a tie bar with a steering lever connected to a shank of the axle and intended for a heavy passenger car, the illustration of FIG. 1 is approximately of natural size.

FIG. 2 shows the socket-shaped bearing body with the spring elements partly in view and partly in section, the illustration of FIG. 2 is at a ratio of approximately 2 : 1 of the actual size of the bearing body.

FIG. 3 is a top view of FIG. 2.

FIG. 4 shows a graph illustrating the force-stroke relationship of the spring elements of the socket-shaped bearing body according to FIGS. 1 to 3.

The above outlined objects have been realized according to the invention by the fact that the spring elements formed by recesses of the bearing body have a different spring characteristic and that the spacing of the upper edges of the spring elements from the supporting surface of the housing on the joint is different and, more specifically, to such an extent that the spacing increases with the increase in the hardness of the spring elements. The spring elements having different spring characteristics will spring in a manner known per se in the axial direction of the ball stud and are annularly arranged. In the rings formed by the annular arrangement there are combined spring elements of the same spring characteristic while in the outermost ring which has the largest diameter, the softest spring elements are combined. With a decrease in the diameter of the ring, the spring elements become harder.

Referring now to the drawing in detail, each end of the tie bar 15 is provided with a hinge pin 7 extending in axial direction. The ball of the hinge pin 7 is journalled in a housing 1 which through the intervention of a threaded stud is positively and adjustably connected to the adjacent steering element, for instance, the steering lever 3 on the axle shank 4 on one side and the steering gear on the other side. The counter nut 2 prevents the housing 1 from rotating. The two bearing bodies 6, 8 consists of an elastically deformable material, for instance, polyurethane. The bearing body 6 which for assembly reasons is two-sectional, is axially held by the likewise two-sectional ring 10 through the intervention of the rolled over end 11 of the housing 1. The bearing body 6 will permit freedom of play, the preload and the yieldability of the bearing. For purposes of obtaining an optimum function, the bearing body 6 is provided with recesses 19, 20 24 and 25 by means of which spring elements 21, 22, 23 are formed which have different spring characteristics. The distance between the upper edges 16, 17 18 of the spring elements 21, 22, 23 from the supporting surface of the joint housing 1 is of different magnitude so that in cooperation with the different spring characteristics of the individual spring elements there is obtained an ideal progressively increasing spring characteristic when the tie bar 15 is loaded in the direction of the arrow 26. The distance or spacing 13 of the upper edge of the spring element 23 from the supporting surface 5 of the joint housing 1 is greater than and exceeds the distance or spacing in FIGS. 2 and 1 identified by reference numerals 12, 31 respectively of the upper edge 17 of the spring elements 22. The upper edge 16 of the spring elements 21 always engages the supporting surface 5 of the housing 1 because the spring elements 21 are preloaded by the amount 27. The graph of FIG. 4 shows the force-stroke interrelationship and indicates that the spring characteristic 28 of the spring elements 21 is flat. When the upper edge 17 of the spring elements 22 contacts the supporting surface 5 of the housing 1, the spring characteristic 29 becomes considerably steeper. The very steep spring characteristic 30 will be obtained when the upper edge 18 of the spring element 23, which practically carries out the function of an elastic abutment, contacts the supporting surface 5. The arrangement furthermore comprises a rubber sleeve 9 for sealing the ball joint 1, 7 and 14 and indicates the pivoting angle of the joint.

The advantages obtained in conformity with the invention are seen primarily in that in view of the shock-absorbing effect realized solely by the particular design of the socket-shaped bearing body which can easily be produced and at low costs, the shocks entering the joints will be reduced to such an extent that the steering linkage can be dimensioned weaker without loosing in strength over corresponding heretofore known steering linkages. In this way not only weight and money are saved but also the driving comfort is greatly improved.

It is, of course, to be understood that the present invention is, by no means, limited to the particular construction shown in the drawing but also comprises any modifications within the scope of the appended claims.

What I claim is:

1. A ball joint, especially for the steering linkage of a motor vehicle, which includes: a ball head, housing means surrounding said ball head in spaced relationship thereto, and socket means of an elastically deformable material interposed between said housing means and the outer peripheral surface of said ball head and slidably engaging said outer peripheral surface of said ball head, said socket means comprising groups of tongue-shaped spring elements resulting from differing recesses therein, the spring elements of one group having a spring characteristic different from that of the spring elements of another group, at least one free end face of the tongue-shaped spring elements of one group of spring elements being spaced from said housing means by a distance less than the distance by which the corresponding free end face of the other group is spaced from said housing means, said groups of spring elements being respectively annularly arranged having coincident axis relationship, the spring elements of said groups being adapted to spring in axial direction of said socket means, said tongue-shaped spring elements residing in groups defining concentric nested circles of different diameters, the spring elements arranged along one and the same circle having the same spring characteristic but differing as to their spring characteristic from the spring elements arranged along another circle.

2. A ball joint according to claim 1, in which upper edge spacing increases as the hardness of said spring elements increases with the distance of the respective spring elements from said housing means.

3. A ball joint according to claim 1, in which the spring elements arranged along the circle with the smallest diameter are softer than the spring elements along a greater diameter circle.

* * * * *